UNITED STATES PATENT OFFICE.

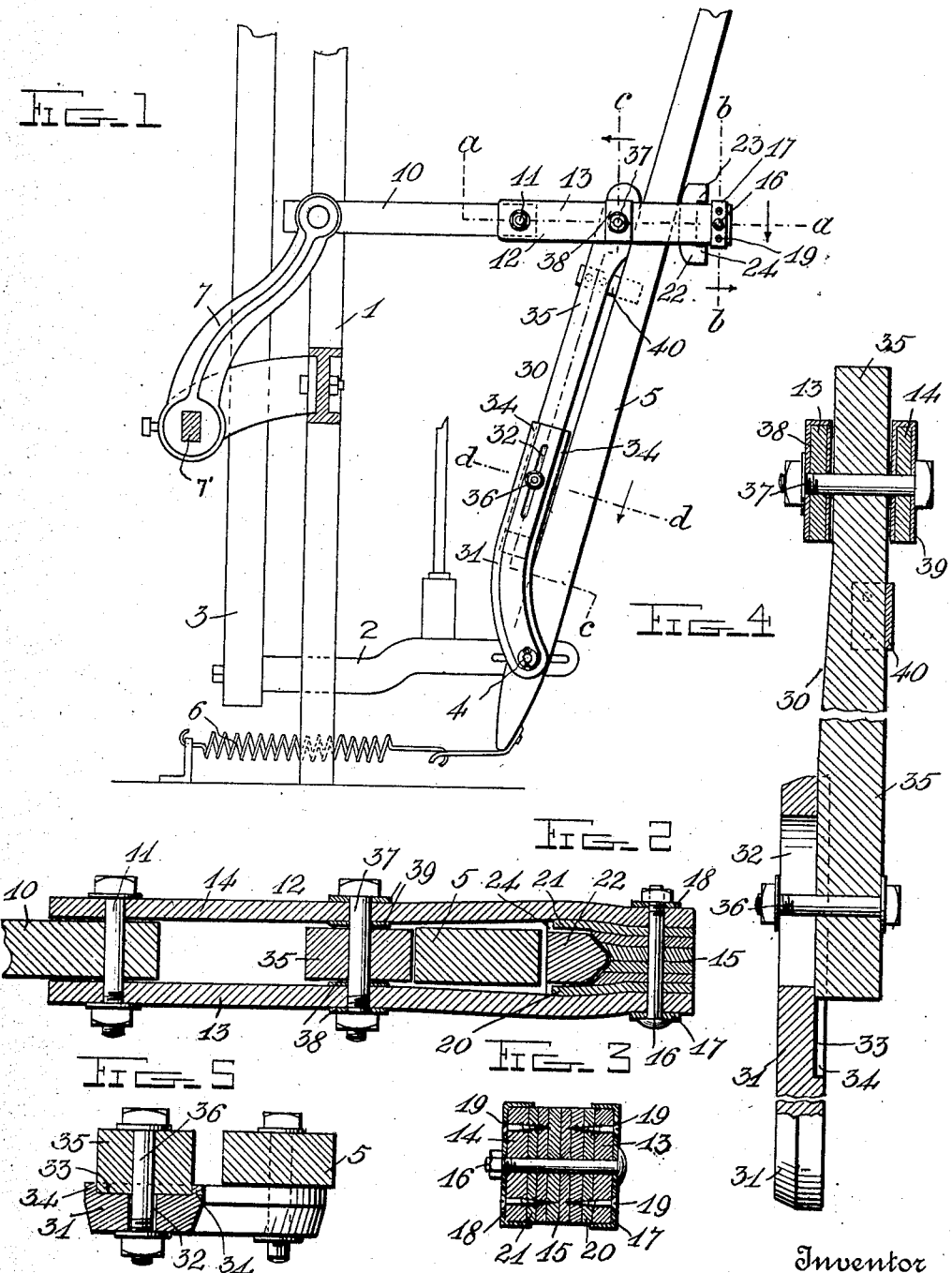

HENRY GRIFFIN, OF KENYON, RHODE ISLAND.

PICKER-MOTION FOR LOOMS.

No. 860,462.　　　　Specification of Letters Patent.　　Patented July 16, 1907.

Application filed January 31, 1907. Serial No. 355,078.

*To all whom it may concern:*

Be it known that I, HENRY GRIFFIN, a citizen of the United States, residing at Kenyon, in the county of Washington and State of Rhode Island, have invented certain new and useful Improvements in Picker-Motions for Looms; and I do declare the following to be a full, clear, and exact description of the invention, such as will enable others skilled in the art to which it appertains to make and use the same.

This invention relates to improvements in looms, and has particular reference to improvements in the manner of mounting and connecting the picker staff or stick with the elements operating it.

The object of the invention is to provide simple means for connecting the sweep stick with the picker stick, which will work higher on said stick than those now in use and will start the shuttle with less power and increase its speed to the end of the picker, and in which there will be very little wear on the picker stick when it strikes the picker.

In the accompanying drawings,—Figure 1 represents a side elevation of a picker staff and a portion of a loom and the connections between the two constructed in accordance with this invention; Fig. 2 represents a horizontal section taken through the sweep stick and strap on line *a—a* of Fig. 1; Fig. 3 represents a vertical section taken through the lug-strap on line *b—b* of Fig. 1; Fig. 4 represents a section through the lug strap and power stick taken on line *c—c* of Fig. 1; and Fig. 5 represents a horizontal section through the picker stick and lug strap support stick taken on line *b—b* of Fig. 1.

In the embodiment illustrated, a loom frame 1 is shown in which is journaled a rock-shaft 2. On one end of the rock-shaft 2 is mounted one of the lay-swords 3, and in the other end thereof is fulcrumed on a stud or stub-shaft 4 the lower end of the picker staff or stick 5. To the lower end of the picker stick 5 is connected a spring 6, which is connected also to some stationary part of the loom and acts to normally hold the picker stick in its outward position, as shown in Fig. 1. The picker stick is adapted to be actuated against the tension of its spring by an arm 7 mounted on the cam shaft 7' and connected to the picker stick through the medium of the sweep stick 10 and the lug strap hereinafter described, all of the parts above described being of ordinary and well known construction.

Connected to the forward end of the sweep stick 10, preferably by bolt 11, is a lug strap 12 composed of two members 13 and 14, which are arranged on opposite sides of the sweep stick and each of which is preferably composed of stiff heavy leather. These members 13 and 14 extend on opposite sides of the picker stick 5 and have arranged between their free ends a heel 15 composed of a plurality of layers of heavy leather secured to said strap members by means of a bolt 16 extending through angle plates 17 and 18 arranged on the outer faces of the strap members 13 and 14 and attached thereto by screws 19. This heel, being made of several thicknesses of leather will last longer than those in ordinary use and the two outer layers 20 and 21 of this heel are extended inwardly beyond the ends of the others to form a socket between which and the picker stick a bunter 22, preferably of wood, is disposed. This bunter 22 is provided with shouldered or flanged ends 23 and 24, which project over and engage the opposite faces of the heel and the edges of the strap members 13 and 14, whereby the bunter is held against displacement. The inner or rear edge of this bunter 22 is rounded or curved slightly to prevent the binding of the picker stick thereagainst. This wooden bunter is designed to save the heel and prevent its heating.

Pivotally-mounted on the stub-shaft or stud on which the lug strap support is fulcrumed is an adjustable power stick 30. This support 30 is designed to be arranged in front of the picker stick and is composed of two overlapping members 31 and 35, the member 31 having its lower end curved and apertured to engage the stub-shaft on which the picker stick is mounted and is provided near its upper end with a longitudinally-disposed slot 32 of sufficient length to permit the adjustment therein of a bolt 36 extending through the member 35 at a point near its lower end for a purpose to be described. The inner face of this member 31 is recessed at 33 to receive the lower end of the member 35, the sides of said recess forming flanges, as 34, to guide the member 35 and hold it against lateral movement and the end wall of the recess in conjunction with the lower end of the slot 32 limits the downward movement of the member 35. The upper end of the member 35 extends between the sweep strap members 13 and 14 adjacent the rear or inner edge of the picker stick and is loosely secured therein by a bolt 37, which passes through U-shaped metal loops 38 and 39 arranged on the sweep strap members 13 and 14 and through said strap members and the member 35 being disposed on the inner face of the member 31 brings it in direct alinement with the picker stick. Secured to one side of the member 35 is a transversely-disposed metal bearing plate 40 having one end extending over the parallel face of the picker stick to guide it and hold it against lateral displacement.

Having thus described my invention, what I claim as new and desire to secure by Letters-Patent, is:—

In a picker motion for looms, a picker staff, means for operating the same comprising a sweep stick, and a lug strap attached thereto, said strap comprising a pair of spaced side members extended respectively on opposite sides of the picker staff, a heel arranged in the outer end of said strap and composed of a plurality of layers of leather arranged in juxtaposition between the side members of the strap, a fastening member extended transversely through said side members and heel for binding said parts together, and a bunter interposed between the heel and picker staff and loosely between the side members of the strap, said bunter having end flanges spaced to engage over the upper and lower faces of the heel for removably securing the bunter in place.

In testimony whereof I have hereunto set my hand in presence of two subscribing witnesses.

HENRY GRIFFIN.

Witnesses:
PATRICK H. KELLY,
HENRY W. LANPHEAR.